(12) United States Patent
Creager

(10) Patent No.: US 12,412,569 B2
(45) Date of Patent: Sep. 9, 2025

(54) DISAMBIGUATION OF REQUESTS FOR DIGITAL ASSISTANT TASK EXECUTION

(71) Applicant: Truist Bank, Charlotte, NC (US)

(72) Inventor: James Harrison Creager, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 365 days.

(21) Appl. No.: 18/072,558

(22) Filed: Nov. 30, 2022

(65) Prior Publication Data
US 2024/0177709 A1 May 30, 2024

(51) Int. Cl.
| | |
|---|---|
| *G10L 15/18* | (2013.01) |
| *G06F 3/0482* | (2013.01) |
| *G06F 40/30* | (2020.01) |
| *G10L 15/22* | (2006.01) |
| *G10L 15/30* | (2013.01) |

(52) U.S. Cl.
CPC ........ *G10L 15/1815* (2013.01); *G06F 3/0482* (2013.01); *G06F 40/30* (2020.01); *G10L 15/22* (2013.01); *G10L 15/30* (2013.01); *G10L 2015/223* (2013.01)

(58) Field of Classification Search
CPC ... G10L 15/1815; G10L 15/18; G10L 15/183; G10L 15/22; G10L 15/30; G10L 15/1822; G10L 15/063; G10L 2015/223; G10L 15/01; G10L 15/20; G10L 2015/221; G10L 2015/225; G10L 2015/228; G10L 15/28; G10L 15/32; G10L 15/34; G10L 21/00; G10L 25/00; G10L 99/00; G06F 16/3329; G06F 16/00; G06F 16/433; G06F 16/3334; G06F 3/0482; G06F 3/167; G06F 3/0481; G06F 9/453; G06F 40/30; G06F 40/35; G06F 40/295; G06F 40/40; G06F 40/289; G06F 40/284; G06F 40/279; G06Q 10/02; G06Q 50/01; G01S 5/28; G06N 5/04
USPC ....... 704/255, 257, 236, 237, 238, 239, 240, 704/235, 233, 232, 231, 200, 202, 207, 704/208, 209, 210, 1–9
See application file for complete search history.

(56) References Cited

U.S. PATENT DOCUMENTS

| | | | |
|---|---|---|---|
| 9,378,740 B1 * | 6/2016 | Rosen | G10L 15/1822 |
| 11,527,237 B1 * | 12/2022 | Sarikaya | G10L 15/16 |
| 2024/0013211 A1 * | 1/2024 | Edwards | G06Q 20/4016 |

* cited by examiner

*Primary Examiner* — Leshui Zhang
(74) *Attorney, Agent, or Firm* — Kilpatrick Townsend & Stockton LLP; Michael A. Springs, Esq.

(57) ABSTRACT

A computer-implemented method includes receiving an utterance from a user comprising an intent, the intent defining a task executable by the digital assistant in response to the utterance. The method also includes transmitting the utterance to a natural language processing system. The method further includes receiving predicted intents and slot values determined by the natural language processing system based on the utterance, the predicted intents defining tasks executable by the digital assistant and the slot values providing information usable by the digital assistant to execute the tasks. Additionally, the method includes determining, based on a hierarchy model, a common ancestor for the predicted intents. Further, the method includes generating a response for display to the user using the predicted intents, the slot values, and the common ancestor, the response usable by the digital assistant to determine the intent.

17 Claims, 4 Drawing Sheets

DISAMBIGUATION OF REQUESTS FOR DIGITAL ASSISTANT TASK EXECUTION

TECHNICAL FIELD

The present disclosure relates generally to managing automated communication systems and, more particularly (although not necessarily exclusively), to disambiguation of requests for digital assistant task execution.

BACKGROUND

A digital assistant may be a software application used to conduct a conversation via text, text-to-speech, speech-to-text, or speech-to-speech in place of direct contact with a live human agent. The digital assistant may interpret natural language entered by a user to navigate an algorithm that may be arranged to execute a variety of possible outcomes. In some examples, the digital assistant may incorrectly interpret the natural language entered by the user, which can cause execution of a task resulting in an unexpected outcome or can cause inefficient communication between the digital assistant and the user.

SUMMARY

In one example, a system includes a processing device and a non-transitory computer-readable medium including instructions that are executable by the processing device to cause the processing device to perform operations. The operations include receiving, by a disambiguation system associated with a digital assistant, an utterance from a user comprising an intent, the intent defining a task executable by the digital assistant in response to the utterance. The operations also include transmitting, by the disambiguation system, the utterance to a natural language processing system. The operations further include receiving, by the disambiguation system, a plurality of predicted intents and a plurality of slot values determined by the natural language processing system based on the utterance, the plurality of predicted intents defining tasks executable by the digital assistant and the plurality of slot values providing information usable by the digital assistant to execute the tasks. Additionally, the operations include determining, based on a hierarchy model associated with the disambiguation system, at least one common ancestor for the plurality of predicted intents. Further, the operations include generating, by the disambiguation system, a response for display to the user using the plurality of predicted intents, the plurality of slot values, and the at least one common ancestor, the response usable by the digital assistant to determine the intent.

In another example, a computer-implemented method includes receiving, by a disambiguation system associated with a digital assistant, an utterance from a user comprising an intent, the intent defining a task executable by the digital assistant in response to the utterance. The method also includes transmitting, by the disambiguation system, the utterance to a natural language processing system. The method further includes receiving, by the disambiguation system, a plurality of predicted intents and a plurality of slot values determined by the natural language processing system based on the utterance, the plurality of predicted intents defining tasks executable by the digital assistant and the plurality of slot values providing information usable by the digital assistant to execute the tasks. Additionally, the method includes determining, based on a hierarchy model associated with the disambiguation system, at least one common ancestor for the plurality of predicted intents. Further, the method includes generating, by the disambiguation system, a response for display to the user using the plurality of predicted intents, the plurality of slot values, and the at least one common ancestor, the response usable by the digital assistant to determine the intent.

In another example, a non-transitory computer-readable medium including instructions that are executable by a processing device for performing operations. The operations include receiving, by a disambiguation system associated with a digital assistant, an utterance from a user comprising an intent, the intent defining a task executable by the digital assistant in response to the utterance. The operations also include transmitting, by the disambiguation system, the utterance to a natural language processing system. The operations further include receiving, by the disambiguation system, a plurality of predicted intents and a plurality of slot values determined by the natural language processing system based on the utterance, the plurality of predicted intents defining tasks executable by the digital assistant and the plurality of slot values providing information usable by the digital assistant to execute the tasks. Additionally, the operations include determining, based on a hierarchy model associated with the disambiguation system, at least one common ancestor for the plurality of predicted intents. Further, the operations include generating, by the disambiguation system, a response for display to the user using the plurality of predicted intents, the plurality of slot values, and the at least one common ancestor, the response usable by the digital assistant to determine the intent.

DETAILED DESCRIPTION

Figure 1:
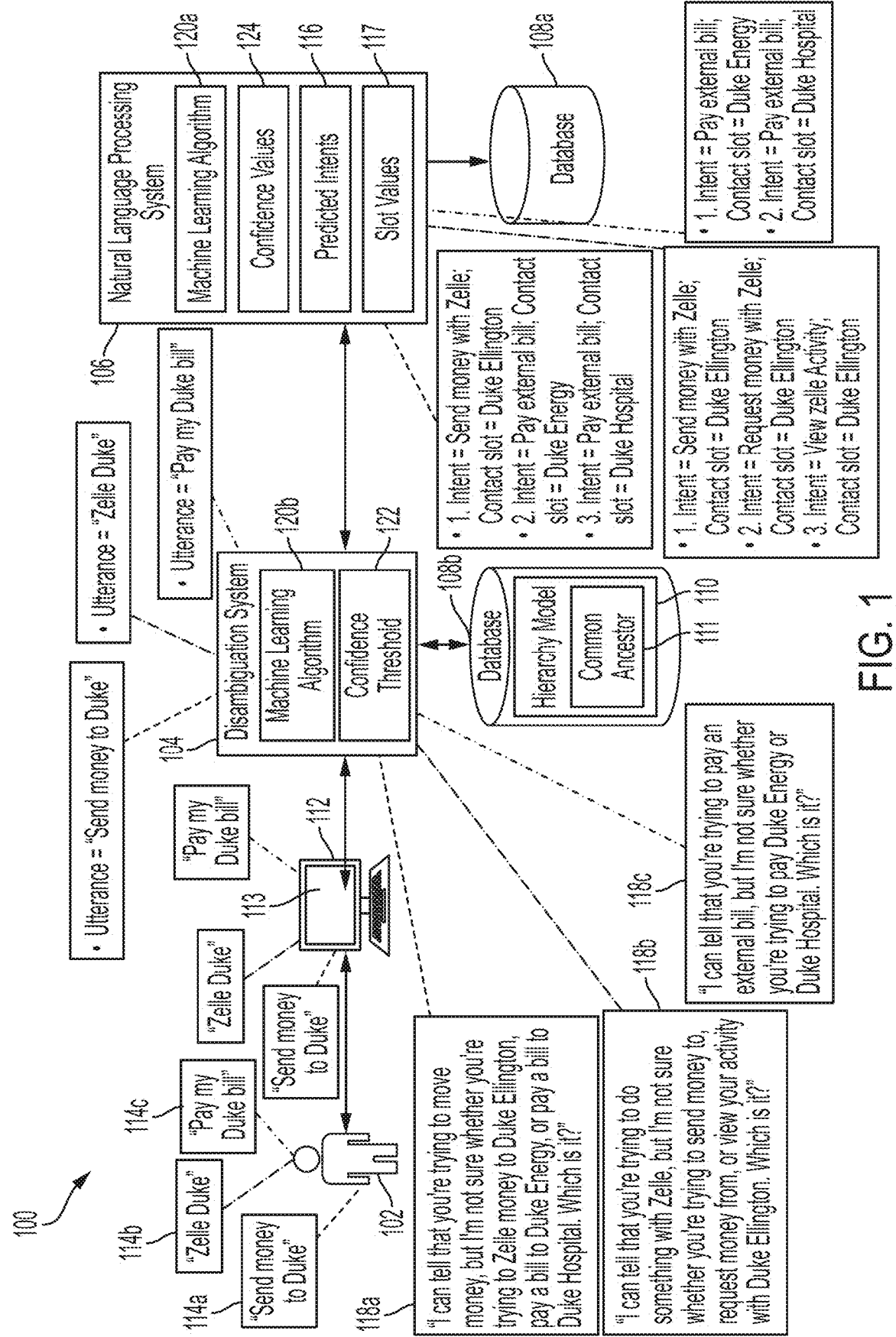
FIG. 1 is a schematic of an example of a system that can disambiguate requests for digital assistant task execution according to one example of the present disclosure.

Certain aspects and examples of the present disclosure relate to a system and method for disambiguating an utterance from a user to a digital assistant to facilitate execution of a task associated with the utterance by the digital assistant. The utterance can be a request for the digital assistant to perform the task. The utterance can include an intent that can define the task. The task may include connecting the user to resources, initiating an electronic transfer for the user, or other suitable tasks. By way of one example, the system can automatically generate a response that can be displayed or otherwise communicated to the user by the digital assistant for disambiguating the utterance. Certain examples provide a disambiguation system that can facilitate quick and accurate execution of tasks by the digital assistant.

In some examples, the utterance can be communicated from the user to the digital assistant via text, speech, or another suitable communication method. The system may receive the utterance via a user device associated with the digital assistant. The system can further transmit the utterance to a natural language processing (NLP) system for transforming the utterance into an input that can be understood by the digital assistant. The NLP system can also determine predicted intents and slot values for the predicted intents, each of which can be associated with the utterance. The predicted intents can be a set of intents with a probability above a certain threshold of being the intent in the utterance. Additionally, the slot values can be data or other suitable information used by the digital assistant to perform the tasks defined by each of the predicted intents.

Additionally, in some examples, the system can formulate a response based on the predicted intents and the slot values to facilitate efficient interaction between the digital assistant and the user. The response can further include a common ancestor for the predicted intents based on a hierarchy model. The hierarchy model can be a model structured to include intents specifying tasks executable by the digital assistant under successive levels of intents that can be each be broader in definition. For example, an intent to pay a bill can be under an intent to transfer money in the hierarchy model. Thus, the common ancestor can be a category that can encompass one or more predicted intents or an intent that is broader in definition than the predicted intents.

The common ancestor can enable the system to generate an intelligent response. For example, the response can state the common ancestor such that the response can communicate to the user that the concept of the utterance is understood. Then, the response can state the predicted intents as options for the user to select from. The options can also include the slot values for the predicted intents. The system can transmit or display the response to the user via the digital assistant, which can enable the user to provide a user selection quickly. The user selection can cause the digital assistant to perform a task as indicated by the selected predicted intent. Therefore, the system can increase the speed and accuracy of digital assistant task execution.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a system 100 that can disambiguate requests for digital assistant task execution according to one example of the present disclosure. The system 100 can include a user device 112, such as a tablet, laptop, or another suitable user device, which can enable communication between a user 102 and the digital assistant 113. The user 102 may use speech, text, or other suitable modes of communication to communicate with the digital assistant 113 via the user device 112. The digital assistant 113 can be an automated system for simulating human conversation and performing tasks on behalf of the user 102. For example, the digital assistant 113 can retrieve information from a user account, connect the user 102 to a live agent, move money for the user 102, etc.

The system 100 can also include a disambiguation system 104 that can receive utterances 114a-c from the user 102. The utterances 114a-c can be requests for the digital assistant 113 to perform the tasks and the utterances 114a-c can include intents that can define the tasks. The disambiguation system 104 can further transmit the utterances 114a-c to a natural language processing (NLP) system 106. The NLP system 106 can include a first machine learning model 120a or other suitable tools or techniques for transforming the utterances 114a-c into comprehendible inputs for the digital assistant 113. The NLP system 106 can further determine predicted intents 116 and slot values 117, which can be received by the disambiguation system 104. In an example in which the NLP system 106 includes the first machine learning algorithm 120a, the first machine learning algorithm 120a can be trained using previous utterances labeled with intents. After training, the first machine learning model 120a can take the utterances 114a-c provided by the user 102 as input and output predicted intents 116. The first machine learning model 120a or another suitable aspect of the NLP system 106 may further determine confidence values 124 for the predicted intents 116. The confidence values 124 can be likelihoods that the predicted intents 116 are the intents associated with the utterances 114a-c.

In an example, the disambiguation system 104 can receive a first utterance 114a from the user 102 via the user device 112. The user device 112 can be a cellular device and the user 102 can communicate with the digital assistant 113 using the cellular device. The first utterance 114a can be speech detected by the digital assistant 113 and can include the statement "send money to duke." The disambiguation system 104, which can be associated with the digital assistant 113, can receive the first utterance 114a from the user device 112.

The disambiguation system 104 can transmit the first utterance 114a to the NLP system 106, which can determine the predicted intents 116 and slot values 117 based on the first utterance 114a. The predicted intents 116 can be tasks executable by the digital assistant 113 and the slot values 117 can be information used by the digital assistant 113 to successfully execute the tasks. For example, the NLP system 106 can take the first utterance 114a as an input and output the predicted intents 116 based on keywords or phrases in the first utterance 114a, such as "send money" and "duke." The NLP system 106 can further access a first database 108a that may contain user data such as contacts, account information, or other suitable user data. The NLP system 106 can retrieve slot values 117 from the first database 108a associated with the keywords or phrases. For example, for the keyword "duke" in the first utterance 114a, the NLP can retrieve contacts "Duke Ellington," "Duke Energy," and "Duke Hospital" as slot values 117 for the first utterance 114a.

The disambiguation system 104 can further transmit a confidence threshold 122 to the NLP system 106. For example, a first confidence threshold can be eighty percent. The first confidence threshold can be a value above which the predicted intents 116 are sufficiently likely to be the intent associated with the first utterance 114a. The NLP system 106 can determine the confidence values 124 for each of the predicted intents 116. If the first utterance 114a generates a confidence value 124 of a predicted intent 116 that exceeds the first confidence threshold, then the NLP system 106 may only identify the individual predicted intent 116 as a prediction for the first utterance 114a.

In an additional example, the NLP system 106 can determine that none of the predicted intents 116 have confidence values 124 exceeding eighty percent. Thus, a second confidence threshold of twenty five percent can be established at the NLP system 106 as a floor. The second confidence threshold can be a value below which the predicted intents 116 are sufficiently unlikely to be the intent associated with the first utterance 114a. That is, the NLP system 106 can determine that three predicted intents 116 have confidence values 124 exceeding twenty five percent, and the NLP system 106 may identify those three predicted intents 116 as potential intents for the first utterance 114a.

Thus, the confidence threshold 122 can be a minimally acceptable likelihood of the predicted intents 116 being the intent associated with the first utterance 114a. The predicted intents 116 can be required to have confidence values 124 generated by the NLP system 106 that exceed the confidence threshold 122 to be received by the disambiguation system 104. In some examples, confidence thresholds 122 such as the first confidence threshold and the second confidence threshold can be predetermined. Additionally, the confidence thresholds 122 can be adjusted based on user data, user frustration level, or other suitable metrics, as discussed in further detail below.

Additionally, the NLP system 106 can pair the slot values 117 to the predicted intents 116. The disambiguation system 104 can receive the predicted intents 116 and the slot values 117 as pairs from the NLP system 106. For example, the disambiguation system 104 can receive a first intent to "send money with Zelle" with a first slot value "Duke Ellington," a second intent to "pay an external bill" with a second slot value "Duke Energy," and a third intent to "pay an external bill" with a third slot value "Duke Hospital."

The disambiguation system 104 can access a second database 108b that can include a hierarchy model 110 to determine a common ancestor 111 for the predicted intents 116. The hierarchy model 110 can be a model consisting of nodes organized into a tree-structure in which low-level nodes can be sorted under successively higher-level nodes. In some examples, the low-level nodes can be the predicted intents 116 and a higher-level node can be the common ancestor 111. For example, the common ancestor 111 for the predicted intents 116 of sending money with Zelle and paying an external bill, as determined for the first utterance 114a, can be "move money."

The disambiguation system 104 can generate a first response 118a to the first utterance 114a based on the predicted intents 116, the slot values 117, and the common ancestor 111. Receiving the predicted intents 116 and the slot values 117 and determining the common ancestor 111 can enable the disambiguation system 104 to formulate an intelligent response that can be easily understood by the user 102. For example, the first response 118a can state "I can tell you are trying to move money, but I'm not sure whether you're trying to zelle money to Duke Ellington, pay a bill to Duke Energy, or pay a bill to Duke hospital. Which is it?" The disambiguation system 104 can transmit the first response 118a to the digital assistant 113 for display to the user 102 via the user device 112.

Additionally, the disambiguation system 104 may further receive a user selection of the third predicted intent. The user 102 can easily provide the user selection based on the first response 118a. For example, the user 102 can say "pay my bill to Duke Hospital." The receipt of the user selection can cause the digital assistant 113 to execute the task defined by the first predicted intent. Thus, the digital assistant 113 can initiate a movement of money to Duke Hospital for the user 102.

In another example, the user 102 can provide a second utterance 114b via text to the digital assistant 113. The second utterance 114b can state "zelle Duke." The disambiguation system 104 may receive the second utterance 114b from the user device 112 and may transmit the second utterance 114b to the NLP system 106.

The disambiguation system 104 can further input user data into a second machine learning algorithm 120b. The user data can include a time in contact with the digital assistant 113, account information, data associated with previous contact with the digital assistant 113, or other suitable user data. In some examples, the user data may be retrieved, by the disambiguation system 104, from the second database 108b. The machine learning algorithms 120a-b can be decision trees, neural networks, support vector machines, other suitable machine learning algorithms, or combinations thereof. The second machine learning algorithm 120b can be trained using historical user data. In an example, the historical user data can be collected via a user survey provided to users after interaction with the digital assistant 113. The training of the second machine learning algorithm 120b can provide insight into user frustration level or other suitable aspects of user experience with the digital assistant 113.

After training, the second machine learning algorithm 120 can take the user data as an input and output an indication of the confidence threshold 122. Therefore, the machine learning algorithm 120 can generate the confidence threshold 122 to ensure the disambiguation system 104 receives the predicted intents 116 most relevant to the second utterance 114b. Additionally, due to the second machine learning algorithm 120b taking user data as input, the confidence threshold 122 can be tailored to the user 102 to increase a quality of communication with the digital assistant 113 for the user 102. The confidence threshold 122 generated by the second machine learning algorithm 120b can be transmitted to the NLP system 106. The NLP system 106 can, via the first machine learning algorithm 120a, determine the predicted intents 116 and generate confidence values 124 for the predicted intents. Further, the NLP system 106 can determine which of the predicted intents 116 have confidence values 124 exceeding the confidence threshold 122.

In an example, the user data can indicate that the user 102 has contacted the digital assistant 113 more than three times within a certain timeframe. The elevated number of contacts within the timeframe may be an indication that the digital assistant 113 is not providing the correct intent to a user. This may indicate that a confidence threshold is set too low, and additional predicted intents should be provided to the user. Therefore, the second machine learning algorithm 120b may generate, for the second utterance 114b, a first confidence threshold of eighty five percent. For example, an initial, first confidence threshold of eighty percent can be adjusted to eighty five percent to improve the likelihood that a single predicted intent with a confidence value exceeding the first confidence threshold is the intent associated with the second utterance 114b.

In some examples, the NLP system 106 may determine that none of the predicted intents 116 have confidence values of at least eighty five percent. In such an example, the second confidence threshold may be used to identify a group of predicted intents 116 that can be presented to a user. Based on the user data indicating user frustration with the predicted intents provided to the user, in some examples a second predetermined confidence threshold of twenty-five percent can be decreased to twenty percent to improve the likelihood that one of the predicted intents with confidence values exceeding the adjusted confidence threshold is the intent associated with the second utterance 114b. The NLP system 106 can determine that three of the predicted intents 116 have confidence values 124 exceeding twenty percent. Thus, in some examples, the second machine learning algorithm 120b can be used to adjust the confidence thresholds 122 to improve communication between the digital assistant 113 and the user 102.

Thus, the NLP system 106 may determine that the predicted intents 116 for the second utterance 114b can be "send money with Zelle," "request money with Zelle," or "view Zelle activity". The NLP system 106 may further access the first database 108a to determine that a single contact, "Duke Ellington," associated with Zelle matches "Duke." Thus, the slot values 117 for the prediction intents 116 for the second utterance 114b can be "Duke Ellington." The disambiguation system 104 can also determine that "zelle" can be the common ancestor 111 for the predicted intents 116. Based on the prediction intents 116, the slot values 117, and the common ancestor 111, the disambiguation system 104 can generate, for the second utterance 114b, a second response 118b. The second response 118b can state "I can tell that you're trying to do something with Zelle, but I am not sure whether you're trying to send money to, request money from, or view your activity with Duke Ellington. Which is it?" The user 102 may select one of the predicted intents 116 by providing a textual response stating, "request money from." The selection of "request money from" by the user 102 can cause the digital assistant 113 to request money from Duke Ellington via Zelle.

In an additional example, the user 102 can provide a third utterance 114c to the digital assistant 113. The third utterance 114c can state "pay my Duke bill." The disambiguation system 104 may transmit the second utterance 114b to the NLP system 106. The NLP system 106 can determine predicted intents 116 and slot values 117 for the third utterance 114c. For example, a first intent can be "pay external bill" with a first slot value of "Duke energy" and a second intent can also be "pay external bill" with a second slot value of "Duke Hospital."

The disambiguation system 104 can receive the predicted intents 116 and the slot values 117 for the third utterance 114c. The disambiguation system 104 can access the second database 108b to determine the common ancestor 111 for the predicted intents 116 based on the hierarchy model 110. The hierarchy model 110 can have dimensions for grouping intents based on type of intents. In some examples, an intent can be in more than one dimension of the hierarchy model 110. For example, "pay external bill" can be mapped to "external bill pay" in a feature dimension of the hierarchy model 110 and "move money" in a goal dimension. Potential common ancestors "external bill pay" and "move money" can be an equal distance from "pay external bill" in the hierarchy model 110. The disambiguation system 104 can execute a ruled-based decision to determine whether "move money" or "external bill pay" can be the common ancestor 111. For example, a rule can be that if a keyword in the predicted intent 116 can be found in a potential common ancestor, then the potential common ancestor can be the common ancestor 111. Therefore, the common ancestor 111 used in the third response 118c can be "external bill pay."

The third response 118c generated by the disambiguation system 104 can state "I can tell you are trying to pay an external bill, but I am not sure whether you are trying to pay Duke Energy or Duke Hospital. Which is it?" The user 102 may select Duke Hospital to cause the digital assistant to pay a bill, on behalf of the user 102, to Duke Hospital.

Figure 2:
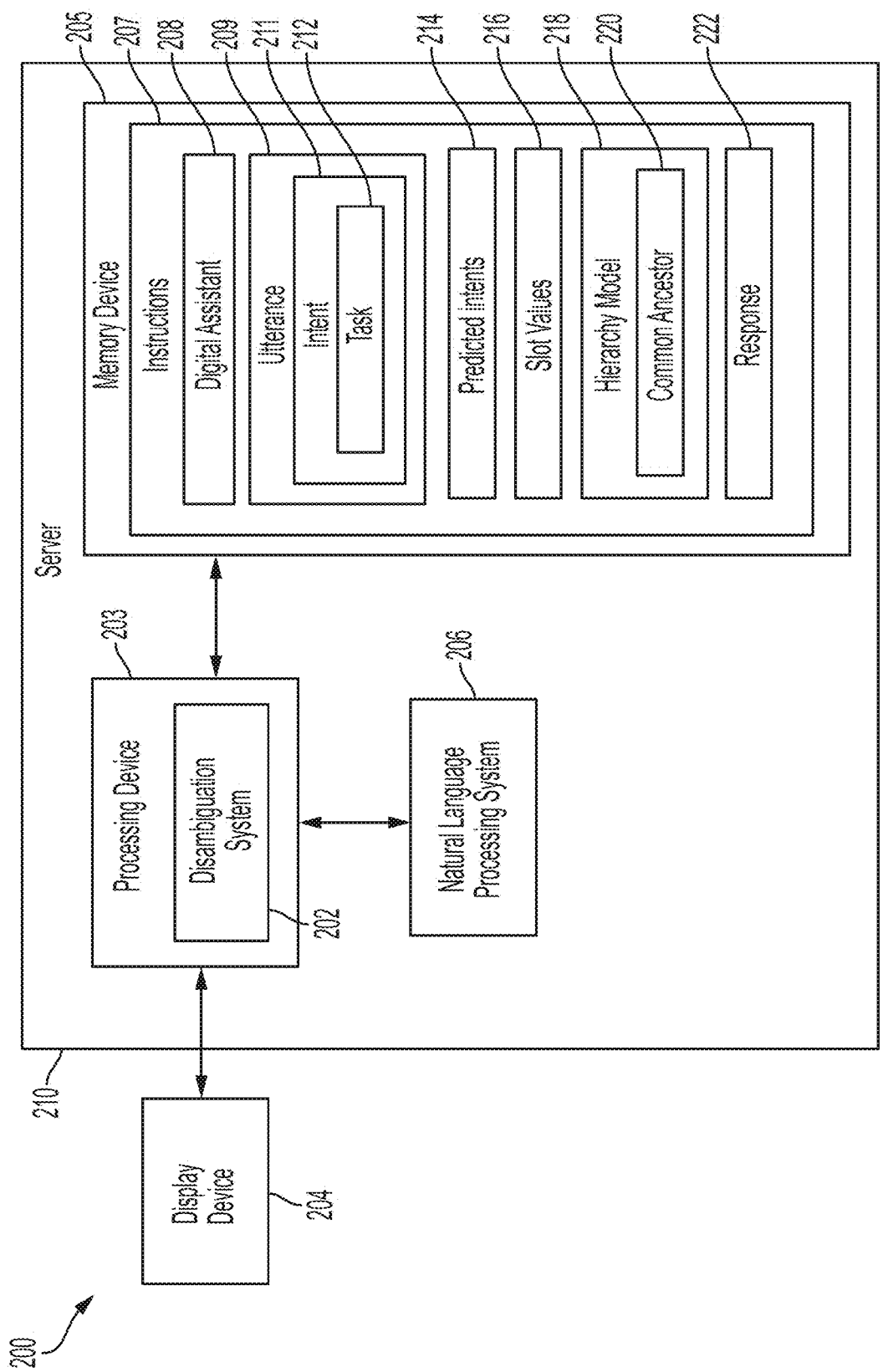
FIG. 2 is a block diagram of an example of a computing device that can disambiguate requests for digital assistant task execution according to one example of the present disclosure.

FIG. 2 is a block diagram of an example of a system 200 that can disambiguate requests for digital assistant task 212 execution according to one example of the present disclosure. The system 200 includes a processing device 203 that is communicatively coupled to a memory device 205. In some examples, the processing device 203 and the memory device 205 can be part of the same computing device, such as the server 210. In other examples, the processing device 203 and the memory device 205 can be distributed from (e.g., remote to) one another.

The processing device 203 can include one processor or multiple processors. Non-limiting examples of the processing device 203 include a Field-Programmable Gate Array (FPGA), an application-specific integrated circuit (ASIC), or a microprocessor. The processing device 203 can execute instructions 207 stored in the memory device 205 to perform operations. The instructions 207 may include processor-specific instructions generated by a compiler or an interpreter from code written in any suitable computer-programming language, such as C, C++, C #, Java, or Python.

The memory device 205 can include one memory or multiple memories. The memory device 205 can be volatile or non-volatile. Non-volatile memory includes any type of memory that retains stored information when powered off. Examples of the memory device 205 include electrically erasable and programmable read-only memory (EEPROM) or flash memory. At least some of the memory device 205 can include a non-transitory computer-readable medium from which the processing device 203 can read instructions 207. A non-transitory computer-readable medium can include electronic, optical, magnetic, or other storage devices capable of providing the processing device 203 with computer-readable instructions or other program code. Examples of a non-transitory computer-readable medium can include a magnetic disk, a memory chip, ROM, random-access memory (RAM), an ASIC, a configured processor, and optical storage.

The processing device 203 can execute the instructions 207 to perform operations. For example, the processing device 203 can receive, via a disambiguation system 202 associated with the digital assistant 208, an utterance 209. The processing device 203 can receive the utterance 209 from a user and the utterance 209 can include an intent 211. The intent 211 can define the task 212 that can be executed by the digital assistant 208 in response to the utterance 209. The processing device 203 can also transmit, by the disambiguation system 202, the utterance 209 to an NLP system 206. The processing device 203 can further receive, by the disambiguation system 202, predicted intents 214 and slot values 216. The predicted intents 214 and the slot values 216 can be determined by the NLP system 206 based on the utterance 209. The predicted intents 214 can define tasks that can be executed by the digital assistant 208 and the slot values 216 can provide information that can be used by the digital assistant 208 to execute the tasks. Additionally, the processing device 203 can determine, based on a hierarchy model 218 associated with the disambiguation system 202, a common ancestor 220 for the predicted intents 214. Further, the processing device 203 can generate, by the disambiguation system 202, a response 222 that can be displayed to the user via display device 204. The response 222 can include the predicted intents 214, the slot values 216, and the common ancestor 220 and the response 222 can be used by the digital assistant 208 to determine the intent 211.

Figure 3:
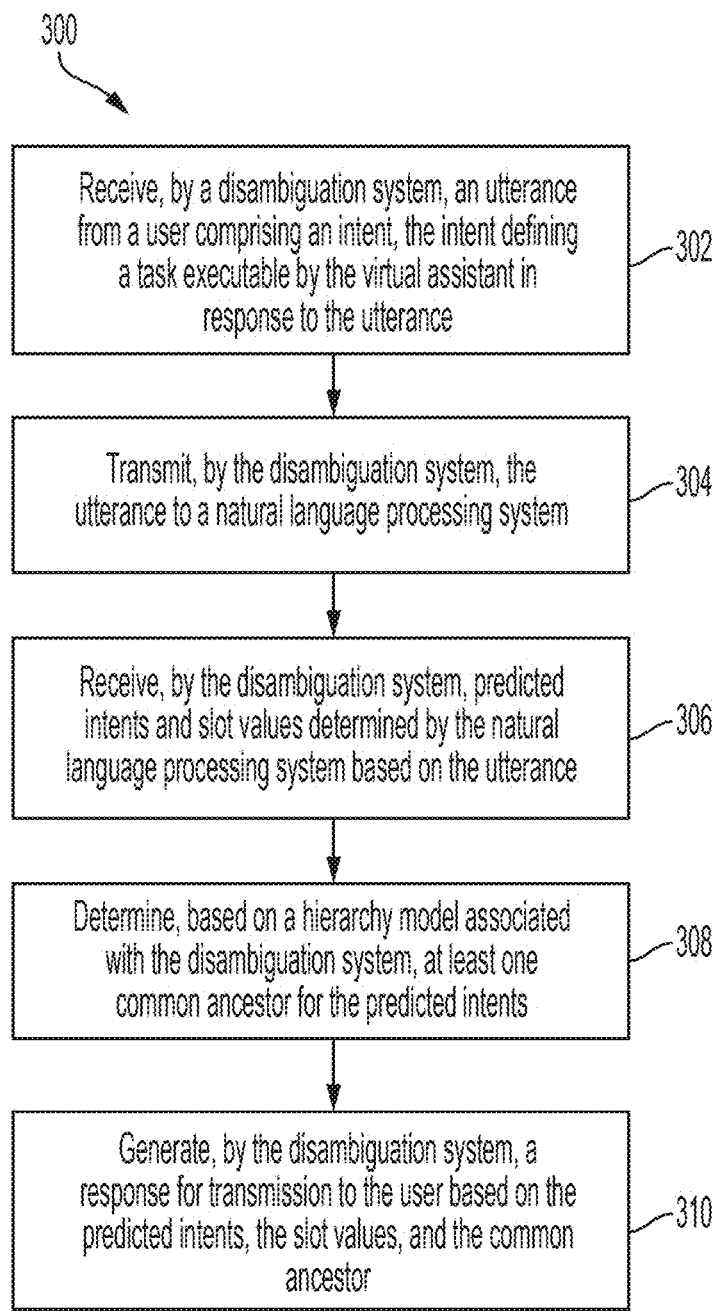
FIG. 3 is a flowchart of a process for disambiguating requests for digital assistant task execution according to one example of the present disclosure.

FIG. 3 is a flowchart of a process 300 for disambiguating requests for digital assistant task execution according to one example of the present disclosure. In some examples, the processing device 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1 and 2.

At block 302, the processing device 203 can receive, by a disambiguation system 202 associated with the digital assistant 208, an utterance 209 from a user 102 including an intent 211. The intent 211 can define a task 212 that is executable by the digital assistant 208 in response to the utterance 209. The user 102 can communicate with the digital assistant 208 via a user device 112 using speech, text, or another suitable communication method. The user device 112 may be a laptop, tablet, phone, etc. The task 212 can be the digital assistant 208 connecting the user 102 to resources, transmitting information for the user 102, retrieving information for the user 102, or other suitable tasks.

At block 304, the processing device 203 can transmit, by the disambiguation system 202, the utterance 209 to the NLP system 206. The NLP system 206 can be a system for transforming human speech or text into an input that can be understood by the digital assistant 208. Additionally, the NLP system 206 can be or can include a first machine learning algorithm 120*a* trained to receive the utterance 209 as an input and output predicted intents 214 based on the utterance 209. The NLP system 206, the first machine learning algorithm 120*a*, or a combination thereof may generate confidence values 124 for the predicted intents 214. The confidence values 124 can be likelihoods that each of the predicted intents 214 are the intent 211 associated with the utterance 209. In some examples, the processing device 203 can further transmit, by the disambiguation system 202, a confidence threshold 122 to the NLP system 206. The confidence threshold 122 can represent a threshold percentage above which the predicted intents 214 are sufficiently likely to be the intent 211 associated with the utterance 209.

Additionally, the processing device 203 may input, by the disambiguation system 202, user data into a second machine learning algorithm 120*b*. The user data can include data related to past interactions with the digital assistant 208, data related to a current interaction with the digital assistant 208, account information, or other suitable user data. In some examples, the second machine learning algorithm 120*b* can be trained using historical user data to generate or adjust confidence thresholds 122 based on the user data. The second machine learning algorithm 120*b* can generate the confidence thresholds 122 to facilitate retrieval of relevant predicted intents 214 from the NLP system 206 and to improve a quality of the communication between the digital assistant 208 and the user 102.

In some examples, the second machine learning algorithm 120*b* can be trained to generate the confidence threshold based on user frustration level, which can be detected by the second machine learning algorithm 120*b* based on the user data. For example, the detected user frustration level can be higher for a user 102 in contact with the digital assistant 113 for greater than fifteen minutes than for a user 102 in contact with the digital assistant 113 for less than fifteen minutes. The second machine learning algorithm 120*b* can be trained using user surveys or other suitable historical user data indicative of the user frustration level.

The processing device 203 can also receive, via the disambiguation system 202, an output of the machine learning model indicating the confidence threshold 122. The confidence threshold 122 can be an adjusted confidence threshold based on the machine learning algorithm detecting user frustration or other suitable metrics from the user data. For example, an input in the machine learning algorithm 120 can indicate that the user 102 has been in communication with the digital assistant 208 for greater than ten minutes and the output of the machine learning model can be a confidence threshold 122 of ninety percent. The confidence threshold 122 of ninety percent can increase a likelihood of the NLP system correctly interpreting the intent 211 of the utterance 209, as a predicted intent with a confidence value above ninety percent is most likely the intent 211. The processing device 203 can further transmit, by the disambiguation system 202, the confidence threshold 122 output by the machine learning algorithm 120 to the NLP system 206.

At block 306, the processing device 203 can receive, by the disambiguation system 202, the predicted intents 214 and the slot values 216 determined by the NLP system 206 based on the utterance 209. In an example, the predicted intents 214 define tasks executable by the digital assistant 208 and the slot values 216 provide information usable by the digital assistant 208 to execute the tasks. The NLP system 206 may determine confidence values 124 for the predicted intents 214 such that the predicted intents 214 received by the disambiguation system 202 can have confidence values 124 exceeding the confidence threshold 122. The NLP system 206 may access a database, user account, or the like to determine the slot values 216. In some examples, the disambiguation system 202 may receive at least one slot value per predicted intent 214.

At block 308, the processing device 203 can determine, based on a hierarchy model 218 associated with the disambiguation system 202, a common ancestor 220 for the predicted intents 214. In some examples, the hierarchy model 218 can be a mapping of a first set of intents to a second set of intents. The second set of intents may more broadly define the tasks executable by the digital assistant 208 than the first set of intents. For example, the first set of intents may include "pay internal bill," which can be mapped to "move money" in the second set of intents. Therefore, the predicted intents 214 can be included in the first set of intents and the common ancestor 220 can be any of the second set of intents.

In some examples, the disambiguation system 202 can parse levels of the heirchy model until a common ancestor 220 for an entirety of the predicted intents 214 can be determined. Thus, the common ancestor 220 can be a closest common ancestor for the predicted intents 214. Additionally, the hierarchy model 218 can include dimensions for catagorizing intents based on type of intent or other suitable catagories. In an example, the second set of intents can be positioned in the dimensions of the hierarchy model 218 based on the type of intent for each intent of the second set of intents. For example, "move money" can be in a goal dimension of the hierarchy model, while "accounts" can be in a feature dimension of the hierarchy model 218.

In an example, the processing device 203 can determine a first common ancestor and a second common ancestor, which can be equal distance from the predicted intents 214 in the hierarchy model 218. The processing device 203 can determine the common ancestor 220 for the intents by executing, by the disambiguation system 202, a rule-based decision to determine whether to include the first common ancestor or the second common ancestor in the response 222. In some examples, any number of common ancestors may be an equal distance from the predicted intents 214. The number of common ancestors that are an equal distance from the predicted intents 214 can be up to a number of dimensions in the hierarchy model 218. Thus, the rule-based decision can be used to identify the common ancestor 220 for the response 222 out of any number of common ancestors. Additionally, any suitable rule can be implemented for the rule-based decision. In some examples, the rule-based decision can be based on information from the slot values 216, keywords in the utterance 209, or other suitable information available to the disambiguation system 202.

At block 310, the processing device 203 can generate, by the disambiguation system 202, the response 222 for transmission to the user 102 using the predicted intents 214, the slot values 216, and the common ancestor 220, the response 222 usable by the digital assistant 208 to determine the intent 211. The transmission of the response 222 can be the digital assistant 208 communicating the response 222 to the user 102 via text or speech. The response 222 can also be displayed to the user 102 via the digital assistant 208. The disambiguation system 202 may formulate the response 222 by stating the common ancestor 220 to show the user 102 that the utterance 209 was comprehended by the digital assistant 208. The common ancestor 220 may be followed, in the response 222, with pairs of the predicted intents 214 and the slot values 216. The response 222 may further include a question to facilitate the selection of a predicted intent 214, a slot value 216, or a combination thereof by the user 102. The response 222 can be formulated by the disambiguation system 202 to seamlessly stimulate human conversation.

In some examples, the process 300 can further include the processing device 203 receiving, by the disambiguation system 202, a user selection of the predicted intent 214 to cause execution of the task 212 defined by the predicted intent 214 by the digital assistant 208. The disambiguation system 202 or the digital assistant 208 can instruct relevant systems to complete the task 212. For example, for a user selection of a predicted intent 214 of "send money to" in relation an utterance 209 stating "zelle Duke" can cause the digital assistant 208 to access Zelle or to otherwise prompt a transaction via Zelle for the user 102. The digital assistant 208 can further direct the transaction via Zelle to "Duke Ellington" based on "Duke Ellington" being a slot value 216 received by the disambiguation system 202 from the NLP system 206.

Figure 4:
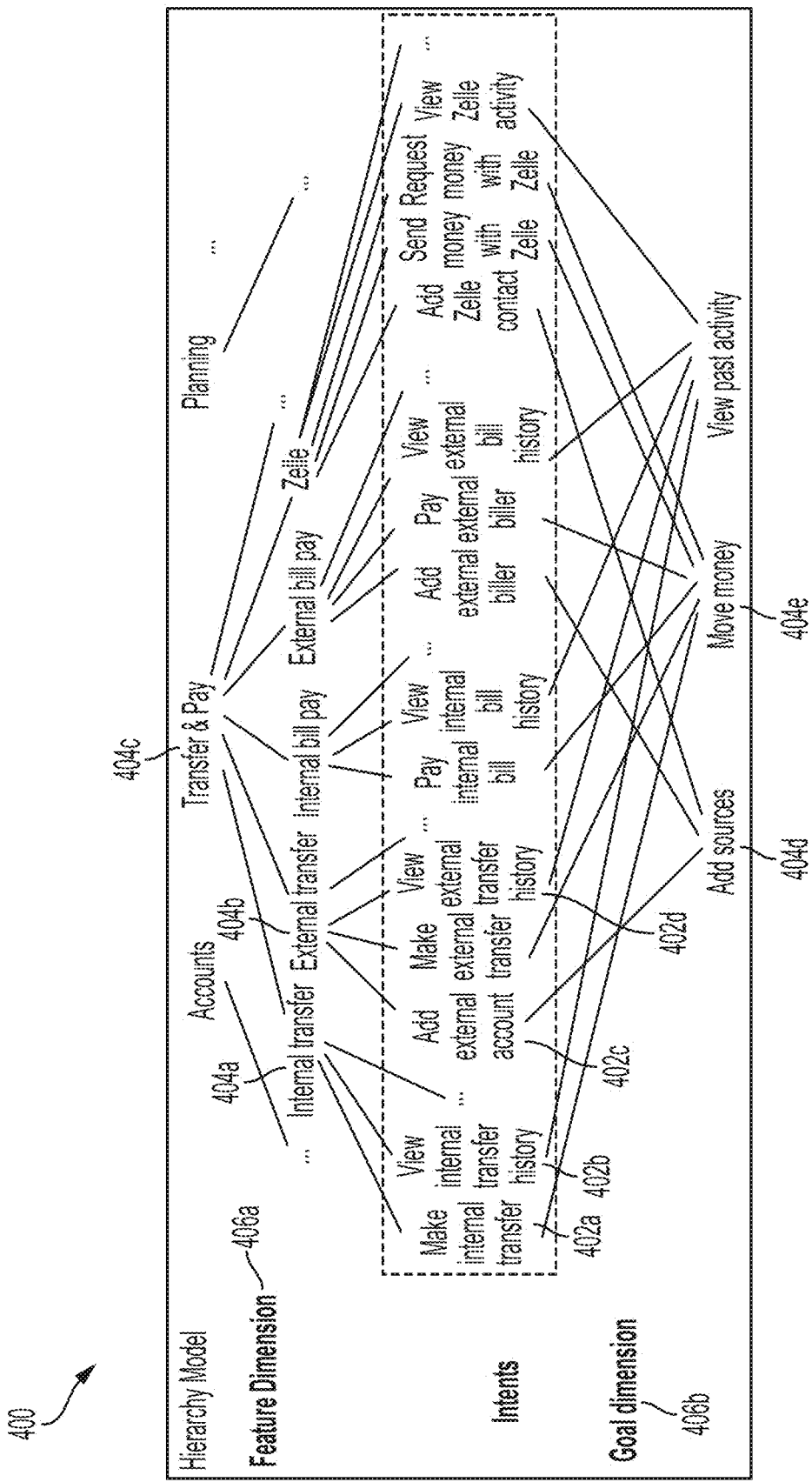
FIG. 4 is a schematic of an example of a hierarchy model that can be used to disambiguate requests for digital assistant task execution according to one example of the present disclosure.

FIG. 4 is a schematic of an example of a hierarchy model 400 that can be used to disambiguate requests for digital assistant task execution according to one example of the present disclosure. The hierarchy model 400 can include a first set of intents 402*a-d* that can be mapped to a second set of intents 404*a-e*. The first set of intents 402*a-d* can be specific tasks that can be requested by a user and performed by the digital assistant. The second set of intents 404*a-e* can be more broadly define tasks to encompass any number of the first set of intents 402*a-d*. Additionally, the second set of intents 404*a-e* can be organized into levels that can be increasingly broad in definition. For example, "internal transfer" can be a first intent 404*a* and intents 402*a-b* can be mapped to the first intent 404*a*. Additionally, "transfer and pay" can be a third intent 404*c* that is broader in definition that the first intent 404*a*. Therefore, intents 402*a-d* can be mapped to the third intent 404*c*.

In some examples, the hierarchy model 400 can have a feature dimension 406*a* that can include intents 404*a-c* that define features of tasks. Additionally, the hierarchy model 400 can have a goal dimension 406*b* with intents that define goals of tasks. For example, an external transfer of money can be a feature of adding an external account. In other words, adding the external account can enable the user to transfer money externally. Additionally, a goal of adding an external account can be to add sources for the user to access. In other words, the purpose of adding the external account can be to add sources for the user. Thus, the intent 402*c* for adding an external account can be mapped to "external transfer" in the feature dimension 406*a* and to "add sources" in the goal dimension 406*b*. In an example, the second set of intents 404*a-e* can be organized into the dimensions 406*a-b* and the first set of intents 402*a-d* can be mapped to any number of intents in the dimensions 406*a-b*.

The hierarchy model 400 can include a different number or different organization of intents than is depicted. Additionally, the intents can be organized into any number dimensions. Additional dimensions can be based on various categories or types of intents.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A disambiguation system associated with a digital assistant, the disambiguation system comprising:
   a processing device; and
   a memory device that includes instructions executed by the processing device for causing the processing device to perform operations comprising:
   receiving an utterance comprising an intent from a user, the intent defining a task executable by the digital assistant in response to the utterance;
   determining, based on user data, a time frame during which the user has been in contact with the digital assistant;
   determining that the time frame exceeds a time frame threshold;
   in response to determining that the time frame exceeds the time frame threshold, adjusting a confidence score threshold to increase the confidence score threshold;
   transmitting the utterance and the increased confidence score threshold to a natural language processing system;
   receiving a plurality of predicted intents associated with confidence scores that exceed the increased confidence score threshold and a plurality of slot values determined by the natural language processing system based on the utterance, the plurality of predicted intents defining tasks executable by the digital assistant and the plurality of slot values providing information usable by the digital assistant to execute the tasks;
   determining, based on a hierarchy model, at least one common ancestor for the plurality of predicted intents; and
   generating a response for display to the user using the plurality of predicted intents, the plurality of slot values, and the at least one common ancestor, the response usable by the digital assistant to determine the intent.

2. The disambiguation system of claim 1, further comprising:
   receiving a user selection of a predicted intent from the plurality of predicted intents to cause execution of the task defined by the intent by the digital assistant.

3. The disambiguation system of claim 1, wherein the hierarchy model is a mapping of a first plurality of intents to a second plurality of intents, wherein the second plurality of intents more broadly defines the tasks executable by the digital assistant than the first plurality of intents, and wherein the at least one common ancestor for the first plurality of intents is at least one of the second plurality of intents.

4. The disambiguation system of claim 3, wherein the hierarchy model further comprises a plurality of dimensions for catagorizing intents based on a type of intent, wherein the second plurality of intents are positionable in the plurality of dimensions of the hierarchy model based on the type of intent for each intent of the second plurality of intents.

5. The disambiguation system of claim 1, wherein the at least one common ancestor comprises a first common ancestor and a second common ancestor and wherein the operation of determining, based on a hierarchy model, the at least one common ancestor for the predicted intents further comprises:
  executing a rule-based decision to determine whether to include the first common ancestor or the second common ancestor in the response.

6. The disambiguation system of claim 1, further comprising, prior to adjusting the confidence score threshold:
  inputting, by the disambiguation system, the user data into a machine learning algorithm; and
  receiving, by the disambiguation system, an output of the machine learning algorithm indicating the confidence score threshold.

7. A computer-implemented method comprising:
  receiving, by a disambiguation system associated with a digital assistant, an utterance comprising an intent from a user, the intent defining a task executable by the digital assistant in response to the utterance;
  determining, based on user data, a time frame during which the user has been in contact with the digital assistant;
  determining that the time frame exceeds a time frame threshold;
  in response to determining that the time frame exceeds the time frame threshold, adjusting a confidence score threshold to increase the confidence score threshold;
  transmitting, by the disambiguation system, the utterance and the increased confidence score threshold to a natural language processing system;
  receiving, by the disambiguation system, a plurality of predicted intents associated with confidence scores that exceed the increased confidence score threshold and a plurality of slot values determined by the natural language processing system based on the utterance, the plurality of predicted intents defining tasks executable by the digital assistant and the plurality of slot values providing information usable by the digital assistant to execute the tasks;
  determining, based on a hierarchy model associated with the disambiguation system, at least one common ancestor for the plurality of predicted intents; and
  generating, by the disambiguation system, a response for transmission to the user using the plurality of predicted intents, the plurality of slot values, and the at least one common ancestor, the response usable by the digital assistant to determine the intent.

8. The computer-implemented method of claim 7, further comprising:
  receiving, by the disambiguation system, a user selection of a predicted intent from the plurality of predicted intents to cause execution of the task defined by the intent by the digital assistant.

9. The computer-implemented method of claim 7, wherein the hierarchy model is a mapping of a first plurality of intents to a second plurality of intents, wherein the second plurality of intents more broadly defines the tasks executable by the digital assistant than the first plurality of intents, and wherein the at least one common ancestor for the first plurality of intents is at least one of the second plurality of intents.

10. The computer-implemented method of claim 9, wherein the hierarchy model further comprises a plurality of dimensions for catagorizing intents based on a type of intent, wherein the second plurality of intents are positionable in the plurality of dimensions of the hierarchy model based on the type of intent for each intent of the second plurality of intents.

11. The computer-implemented method of claim 7, wherein the at least one common ancestor is a first common ancestor and a second common ancestor and wherein determining, based on a hierarchy model associated with the disambiguation system, the at least one common ancestor for the predicted intents further comprises:
  executing, by the disambiguation system, a rule-based decision to determine whether to include the first common ancestor or the second common ancestor in the response.

12. The computer-implemented method of claim 7, further comprising, prior to adjusting the confidence score threshold:
  inputting, by the disambiguation system, the user data into a machine learning algorithm; and
  receiving, by the disambiguation system, an output of the machine learning algorithm indicating the confidence score threshold.

13. A non-transitory computer-readable medium comprising instructions that are executable by a processing device for causing the processing device to perform operations comprising:
  receiving an utterance comprising an intent from a user-comprising an intent, the intent defining a task executable by a digital assistant in response to the utterance;
  determining, based on user data, a time frame during which the user has been in contact with the digital assistant;
  determining that the time frame exceeds a time frame threshold;
  in response to determining that the time frame exceeds the time frame threshold, adjusting a confidence score threshold to increase the confidence score threshold;
  transmitting, the utterance and the increased confidence threshold to a natural language processing system;
  receiving a plurality of predicted intents associated with confidence scores that exceed the increased confidence score threshold and a plurality of slot values determined by the natural language processing system based on the utterance, the plurality of predicted intents defining tasks executable by the digital assistant and the plurality of slot values providing information usable by the digital assistant to execute the tasks;
  determining, based on a hierarchy model, at least one common ancestor for the plurality of predicted intents; and
  generating a response for display to the user using the plurality of predicted intents, the plurality of slot values, and the at least one common ancestor, the response usable by the digital assistant to determine the intent.

14. The non-transitory computer-readable medium of claim 13, further comprising:

receiving a user selection of a predicted intent from the plurality of predicted intents to cause execution of the task defined by the intent by the digital assistant.

15. The non-transitory computer-readable medium of claim 13, wherein the hierarchy model is a mapping of a first plurality of intents to a second plurality of intents, wherein the second plurality of intents more broadly defines the tasks executable by the digital assistant than the first plurality of intents, and wherein the at least one common ancestor for the first plurality of intents is at least one of the second plurality of intents.

16. The non-transitory computer-readable medium of claim 15, wherein the hierarchy model further comprises a plurality of dimensions for catagorizing intents based on a type of intent, wherein the second plurality of intents are positionable in the plurality of dimensions of the hierarchy model based on the type of intent for each intent of the second plurality of intents.

17. The non-transitory computer-readable medium of claim 13, wherein the at least one common ancestor is a first common ancestor and a second common ancestor and wherein the operation of determining, based on a hierarchy model, at least one common ancestor for the predicted intents further comprises:
executing a rule-based decision to determine whether to include the first common ancestor or the second common ancestor in the response.

* * * * *